United States Patent
Nie et al.

(10) Patent No.: US 12,158,912 B2
(45) Date of Patent: Dec. 3, 2024

(54) MULTI-TASK DEEP HASH LEARNING-BASED RETRIEVAL METHOD FOR MASSIVE LOGISTICS PRODUCT IMAGES

(71) Applicant: Shandong Jianzhu University, Jinan (CN)

(72) Inventors: Xiushan Nie, Jinan (CN); Letian Wang, Jinan (CN); Xingbo Liu, Jinan (CN); Shaohua Wang, Jinan (CN)

(73) Assignee: Shandong Jianzhu University, Jinan (CN)

( * ) Notice: Subject to any disclaimer, the term of this patent is extended or adjusted under 35 U.S.C. 154(b) by 44 days.

(21) Appl. No.: 17/809,601

(22) Filed: Jun. 29, 2022

(65) Prior Publication Data

US 2022/0414144 A1    Dec. 29, 2022

(30) Foreign Application Priority Data

Jun. 29, 2021    (CN) .......................... 202110732492.3

(51) Int. Cl.
  *G06F 16/56*    (2019.01)
  *G06F 16/51*    (2019.01)
  (Continued)

(52) U.S. Cl.
  CPC .............. *G06F 16/56* (2019.01); *G06F 16/51* (2019.01); *G06V 10/761* (2022.01);
  (Continued)

(58) Field of Classification Search
  None
  See application file for complete search history.

(56) References Cited

U.S. PATENT DOCUMENTS

2009/0138468 A1*  5/2009  Kurihara ............. G06F 16/5838
                                                     707/999.005
2018/0260665 A1*  9/2018  Zhang ..................... G06F 18/22
(Continued)

FOREIGN PATENT DOCUMENTS

CN         108108657 A  *  6/2018    ........... G06F 16/325
CN         110659726 A  *  1/2020    ........... G06N 3/0454
(Continued)

OTHER PUBLICATIONS

Multi-Task Learning for Deep Semantic Hashing, Ma et al, IEEE (Year: 2018).*

(Continued)

*Primary Examiner* — Augustine K. Obisesan
(74) *Attorney, Agent, or Firm* — Emerson Thomson Bennett; Daniel A. Thomson

(57) ABSTRACT

The present disclosure provides a multi-task deep Hash learning-based retrieval method for massive logistics product images. According to the idea of multi-tasking, Hash codes of a plurality of lengths can be learned simultaneously as high-level image representation. Compared with single-tasking in the prior art, the method overcomes shortcomings such as waste of hardware resources and high time cost caused by model retraining under single-tasking. Compared with the traditional idea of learning a single Hash code as an image representation and using it for retrieval, information association among Hash codes of a plurality of lengths is mined, and the mutual information loss is designed to improve the representational capacity of the Hash codes, which addresses the poor representational capacity of a single Hash code, and thus improves the retrieval performance of Hash codes.

5 Claims, 2 Drawing Sheets

(51) Int. Cl.
*G06V 10/74* (2022.01)
*G06V 10/77* (2022.01)
*G06V 10/776* (2022.01)
*G06V 10/94* (2022.01)

(52) U.S. Cl.
CPC ........ *G06V 10/7715* (2022.01); *G06V 10/776* (2022.01); *G06V 10/95* (2022.01)

(56) References Cited

U.S. PATENT DOCUMENTS

| | | | |
|---|---|---|---|
| 2018/0276528 A1* | 9/2018 | Lin | G06V 30/274 |
| 2019/0171665 A1* | 6/2019 | Navlakha | G06V 10/761 |
| 2020/0242422 A1* | 7/2020 | Wang | G06V 10/7715 |
| 2020/0286112 A1* | 9/2020 | Zhou | G06N 3/084 |
| 2022/0147743 A1* | 5/2022 | Roy | G06V 10/82 |
| 2022/0343638 A1* | 10/2022 | Wang | G16H 30/40 |
| 2024/0037733 A1* | 2/2024 | Bang | G06V 10/95 |

FOREIGN PATENT DOCUMENTS

| | | | | |
|---|---|---|---|---|
| CN | 107679250 B | * | 12/2020 | ........... G06F 16/583 |
| CN | 113220916 A | * | 8/2021 | |
| CN | 109063112 B | * | 4/2022 | |
| CN | 111460200 B | * | 7/2023 | ............. G06F 16/55 |
| CN | 112182272 B | * | 7/2023 | ........... G06F 16/583 |
| CN | 118277604 A | * | 7/2024 | |

OTHER PUBLICATIONS

Query-Adaptive Image Search With Hash Codes. Jiang et al (Year: 2013).*

* cited by examiner

MULTI-TASK DEEP HASH LEARNING-BASED RETRIEVAL METHOD FOR MASSIVE LOGISTICS PRODUCT IMAGES

CROSS REFERENCE TO RELATED APPLICATION

This patent application claims the benefit and priority of Chinese Patent Application No. 202110732492.3, filed on Jun. 29, 2021, the disclosure of which is incorporated by reference herein in its entirety as part of the present application.

TECHNICAL FIELD

The present disclosure relates to the technical field of image processing, and in particular to a multi-task deep Hash learning-based retrieval method for massive logistics product images.

BACKGROUND ART

In recent years, with the rapid development of the Internet and electronics technology, information on the Internet has shown an explosive growth. As a result, massive multimedia data such as texts, images, and audios are uploaded almost in every second. This has posed great challenge to many areas requiring Efficient Nearest Neighbor Search, especially retrieval of massive images. When there is a small data size of images in the database, the simplest and direct way to achieve exhaustive search is to calculate an Euclidean distance between a point in the database and a query point, and finally sort them by distance. The time complexity is linear complexity O(dn), where d and n denote a dimension and a sample size of data, respectively. However, when there is a large data size of images, such as millions to hundreds of millions of images, linear search is no longer applicable. In addition, it has become a tendency in the field of computer vision to use high-dimensionality data or structured data to express image information of an object more accurately, and calculate the distance between images of the object using complex similarity calculation formulas. In these cases, exhaustive search has enormous limitations, which makes it impossible to efficiently complete the nearest neighbor search.

Therefore, approximate nearest neighbor search has been adopted recently to quickly search for effective solutions. Hash is an approximate nearest neighbor search algorithm under extensive study, which can convert documents, images, videos and other multimedia information into compact binary codes, and retain the similarity between original data. Hamming distance is used for measuring the distance between binary codes (also known as Hash codes), which can be quickly solved by Exclusive OR of hardware. Therefore, Hash algorithm has great advantages in storage and efficiency, making it one of the most popular approximate nearest neighbor search algorithms. The present disclosure is oriented towards the field of massive logistics product images in the logistics industry. Therefore, how to quickly and effectively search a database for pictures required has become one of the points to be broken through. Owing to its advantages, Hash learning based on nearest neighbor algorithm has become a powerful tool for mass data search in recent years.

According to most Hash methods, firstly, a fixed length (e.g., 16, 32, 48) is predetermined for a Hash code to be retrieved. Then the model is trained to learn the Hash code as a high-level image representation, and is used to retrieve mass multimedia data quickly and effectively. When the length of the Hash code is predefined, a Hash code of another length is then required for representation and retrieval once the demand changes. As a result, the model needs to be retrained to learn the new Hash code, which causes a waste of hardware resources and an increase in time cost. Secondly, it is well known that Hash code is a compact representation of the original sample, and one sample can be represented by Hash codes of different lengths. Intuitively speaking, Hash codes of different lengths representing the same sample reflect specific information of a type different from the original sample. If they are treated as different views of the original sample, there should be some differences and connections among different views. When merely Hash codes of a single length are considered, the potential relationship between them will be ignored, resulting in the loss of interactive information, reduced representational capacity and low retrieval accuracy. Moreover, for most linear non-depth Hash algorithms, feature extraction and Hash function learning are asynchronous. The design of Hash function is a complex task, and seeking an optimization method of the model is even more difficult.

SUMMARY

To overcome disadvantages of the above technologies, the present disclosure provides a multi-task deep Hash learning-based retrieval method for massive logistics product images, so as to improve the performance of Hashing retrieval.

The technical solution used in the present disclosure to resolve the technical problem thereof is as follows:

a multi-task deep Hash learning-based retrieval method for massive logistics product images, including the following steps:

a) conducting image preprocessing on an input logistics product image $x_i$, and constructing a similarity matrix s among logistics product images according to a label of the image $x_i$;

b) conducting convolution and pooling on the preprocessed logistics product image to obtain a one-dimensional feature vector $h_{img}$ of the image, and taking the one-dimensional feature vector $h_{img}$ as a low-level image feature;

c) inputting the low-level image feature $h_{img}$ to a multi-branch network to obtain a high-level image representation $B_k$ indicated by Hash codes of a plurality of lengths, where the multi-branch network is composed of N branches of a same structure;

d) calculating a similarity loss function $SI_{Loss}$ by formula $$SI_{Loss} = \text{Loss}(s_{ij}, b_i b_j^T) = -\frac{1}{n}\sum_{n=0}^{n=1000} s_{ij} b_i b_j^T - \log(1 + e^{b_i b_j^T}),$$

where $s_{ij}$ denotes similarity between an i th image and a j th image, $s_{ij} \in \{1,0\}$, the value of $s_{ij}$ being 1 indicates the i th image is similar to the j th image, the value of $s_{ij}$ being 0 indicates the i th image is not similar to the j th image, $b_i$ denotes a binary Hash code regarding data of the i th image, $b_j$ denotes a binary Hash code regarding data of the j th image, and T denotes transposition;

e) calculating a mutual information loss function $MI_{Loss}$ by formula $$MI_{Loss} = Loss(B_k, W_k^T B_{k+1}) + \gamma_k \|W_k\|_1 = \sum_{k=0}^{N-1} a_k \|B_K - W_K^T B_{k+1}\|_1 + \sum_{K=0}^{N-1} \gamma_k \|W_k\|_1,$$

where $B_k$ denotes a Hash code output from a k th branch, $k \in \{0, \ldots, N-1\}$, $B_{k+1}$ denotes a Hash code output from a k+1 th branch, $W_k$ denotes a mapping matrix for mapping the Hash code output from the k th branch to the Hash code output from the k+1 th branch, $\gamma_k$ denotes a regularization parameter, $\|\cdot\|_1$ denotes an L1 norm, and $a_k$ denotes an optimization parameter;

f) optimizing the similarity loss function $SI_{Loss}$ and the mutual information loss function $MI_{Loss}$ using a stochastic gradient descent algorithm, and after optimization, repeating Step a) to Step e) at least M times to obtain a trained model; g) inputting image data in a database to the trained model in Step f) to obtain a binary Hash code representation $B_{database}$ of different lengths for each image;

h) inputting an image to be retrieved $img_{query}$ to the trained model in Step f) to obtain a binary Hash code representation $B_{query}$ of the image to be retrieved $img_{query}$; and i) calculating a Hamming distance $Dist_{Hamming}$ by formula $Dist_{Hamming} = \|B_{query} \oplus B_{database}\|$, and returning, based on the calculated Hamming distance $Dist_{Hamming}$, mean average precision of a query set of all images to be retrieved in a measurement manner of Average Precision to complete similarity retrieval.

Preferably, there are five convolution layers in Step b), each of the convolution layers is connected to a pooling layer, and adopts a convolution kernel with a size of 3*3, each of the pooling layers adopts a pooling kernel with a size of 2*2, and both the convolution layer and the pooling layer apply a Relu activation function.

Preferably, the multi-branch network in Step c) is composed of N branches of a same structure, and each branch is composed of three full connect layers connected in series with one another.

Preferably, N in Step c) is a positive integer.

Preferably, M in Step f) is 5000.

The present disclosure has the following advantages: according to the idea of multi-tasking, Hash codes of a plurality of lengths can be learned simultaneously as high-level image representations. Compared with single-tasking in the prior art, the method overcomes shortcomings such as waste of hardware resources and high time cost caused by model retraining under single-tasking. Compared with the traditional idea of learning a single Hash code as an image representation and using it for retrieval, in the present disclosure, information association among Hash codes of a plurality of lengths is mined, and the mutual information loss is designed to improve the representational capacity of the Hash codes, which addresses the poor representational capacity of a single Hash code, and thus improves the retrieval performance of Hash codes. In the meanwhile, the model is based on end-to-end learning, that is, image feature extraction and Hash code learning are carried out simultaneously. Compared with the traditional linear Hash method, the model has an intuitive structure, and is easy to migrate and deploy. The multi-task deep Hash learning-based image retrieval method can be well expanded to retrieval of massive images, and therefore has a broad prospect in image retrieval for massive objects in the logistics industry.

DETAILED DESCRIPTION OF THE EMBODIMENTS

Figure 1:
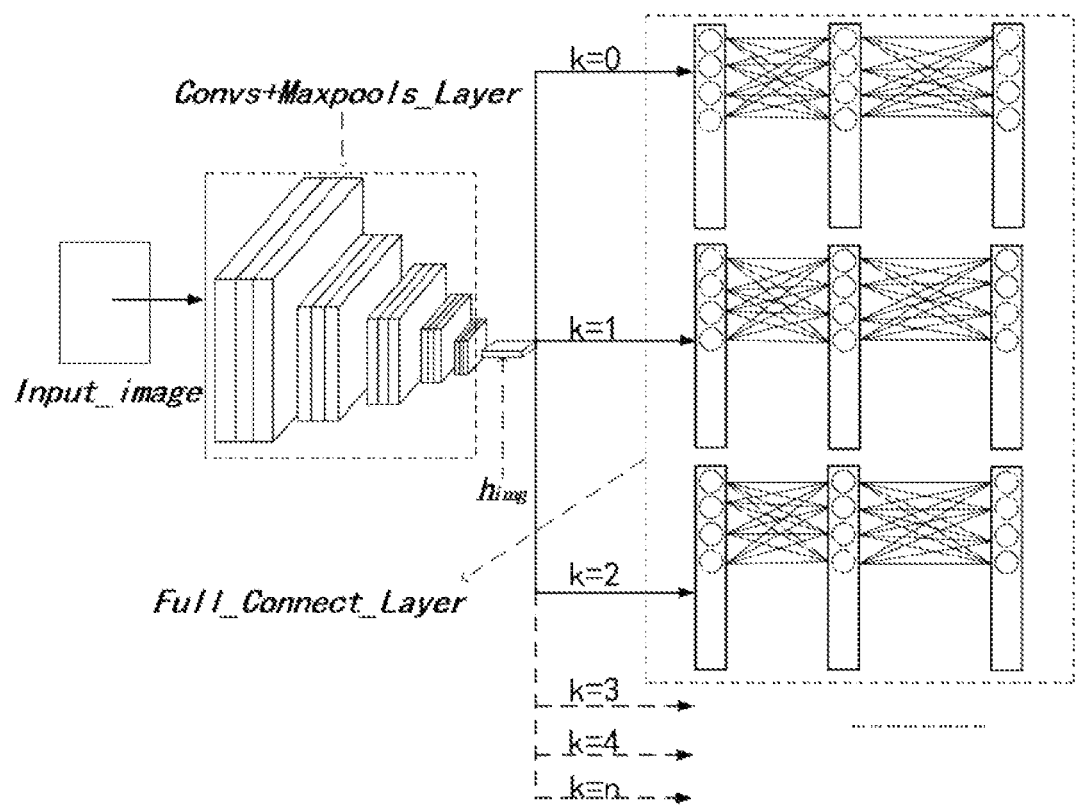
FIG. 1 is a flowchart of a method for multi-task feature extraction according to the present disclosure.
Figure 2:
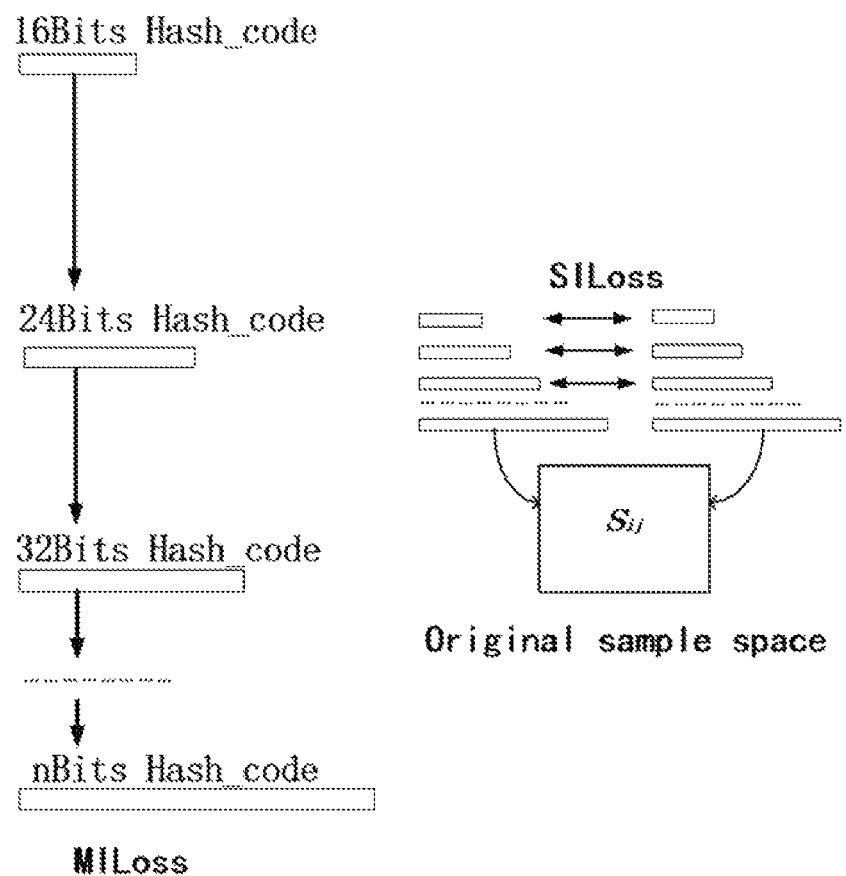
FIG. 2 is a flowchart of a method for Hash code learning according to the present disclosure.

The present disclosure is further described with reference to FIG. 1 and FIG. 2.

A multi-task deep Hash learning-based retrieval method for massive logistics product images, including the following steps: a) Conduct image preprocessing on an input logistics product image $x_i$, and construct a similarity matrix s among logistics product images according to a label of the image $x_i$.

b) Conduct convolution and pooling on the preprocessed logistics product image to obtain a one-dimensional feature vector $h_{img}$ of the image, and obtain the one-dimensional feature vector $h_{img}$ of the image as a low-level image feature by stacking a certain quantity of convolution kernels and pooling kernels, and processing image data.

c) Adopt hard parameter sharing network: the low-level feature networks have the same structure and share parameters. High-level feature networks have the same structure, but the parameters of the branch network are differentiated according to the difference in high-level features generated. Input the low-level image feature $h_{img}$ to the multi-branch network to obtain a high-level image representation $B_k$ indicated by Hash codes of a plurality of lengths, where the multi-branch network is composed of N branches of a same structure.

d) Calculate a similarity loss function $SI_{Loss}$ by formula $$SI_{Loss} = \text{Loss}(s_{ij}, b_i b_j^T) = -\frac{1}{n} \sum_{n=0}^{n=1000} s_{ij} b_i b_j^T - \log\left(1 + e^{b_i b_j^T}\right),$$

where S denotes similarity between an i th image and a j th image, $s_{ij} \in \{1,0\}$, the value of S being 1 indicates the i th image is similar to the j th image, the value of $s_{ij}$ being 0 indicates the i th image is not similar to the j th image, $b_i$ denotes a binary Hash code regarding data of the i th image, $b_j$ denotes a binary Hash code regarding data of the j th image, and T denotes transposition. This formula is mainly to establish a relationship between Hash codes and similarity of the original samples. If the original samples are similar, the corresponding Hash codes should be as similar as possible; and if the original samples are not similar, the corresponding Hash codes should not be similar.

e) Calculate a mutual information loss function $MI_{Loss}$ by formula $$MI_{Loss} = Loss(B_k, W_k^T B_{k+1}) + \gamma_k \|W_k\|_1 = \sum_{k=0}^{N-1} a_k \|B_K - W_K^T B_{k+1}\|_1 + \sum_{K=0}^{N-1} \gamma_k \|W_k\|_1,$$

where $B_k$ denotes a Hash code output from a k th branch, $k \in \{0, \ldots, N-1\}$, $B_{k+1}$ denotes a Hash code output from a k+1 th branch, $W_k$ denotes a mapping matrix for mapping the Hash code output from the k th branch to the Hash code output from the k+1 th branch, $\gamma_k$ denotes a regularization parameter, $\|\cdot\|_1$ denotes an L1 norm, and $a_k$ denotes an optimization parameter. Generally speaking, the length of Hash codes is positively correlated with the representational capacity of Hash codes. The purpose of minimizing mutual information loss $MI_{Loss}$ is to draw the representational capacity of a shorter Hash code closer to a longer Hash code, and further enhance the correlation among a plurality of Hash codes, so that the Hash codes learned have good representational capacity, and the Hash code retrieval is improved.

f) Optimize the similarity loss function $SI_{Loss}$ and the mutual information loss function $MI_{Loss}$ using a stochastic gradient descent algorithm, and after optimization, repeat Step a) to Step e) at least M times to obtain a trained model. g) Input image data in a database to the trained model in Step f) to obtain a binary Hash code representation $B_{database}$ of different lengths for each image. For example, there may be various combinations, such as [16 bits, 32 bits, 48 bits, 64 bits] or [128 bits, 256 bits, 512 bits].

h) Input an image to be retrieved $img_{query}$ to the trained model in Step f) to obtain a binary Hash code representation $B_{query}$ of the image to be retrieved $img_{query}$.

Calculate a Hamming distance $Dist_{Hamming}$ by formula $Dist_{Hamming} = \|B_{query} \oplus B_{database}\|$, and return, based on the calculated Hamming distance $Dist_{Hamming}$, mean average precision of a query set of all images to be retrieved in a measurement manner of Average Precision to complete similarity retrieval.

In the multi-task deep Hash learning-based retrieval method for massive logistics product images, the theory of multi-view learning is adopted to mine potential relevance of Hash codes of different lengths. Hash codes of a plurality of lengths are essentially various feature representations of original data in Hamming space. Associative learning of the Hash codes of a plurality of lengths involves the use of complementarity and correlation of features, and this process can also be regarded as multi-level feature fusion of unified samples. Related theories of multi-feature fusion and multi-view learning provide a theoretical and technical guarantee for the feasibility of this research method, which further improves the performance of Hashing retrieval.

According to the idea of multi-tasking, Hash codes of a plurality of lengths can be learned simultaneously as high-level image representations. Compared with single-tasking in the prior art, the method overcomes shortcomings such as waste of hardware resources and high time cost caused by model retraining under single-tasking. Compared with the traditional idea of learning a single Hash code as an image representation and using it for retrieval, in the present disclosure, information association among Hash codes of a plurality of lengths is mined, and the mutual information loss is designed to improve the representational capacity of the Hash codes, which addresses the poor representational capacity of a single Hash code, and thus improves the retrieval performance of Hash codes. In the meanwhile, the model is based on end-to-end learning, that is, image feature extraction and Hash code learning are carried out simultaneously. Compared with the traditional linear Hash method, the model has an intuitive structure, and is easy to migrate and deploy. The multi-task deep Hash learning-based image retrieval method can be well expanded to retrieval of massive images, and therefore has a broad prospect in image retrieval for masses of objects in the logistics industry.

Table 1 provides a first simulation experiment result according to the method of the present disclosure, which is measured by MAP. Test results on NUS-WIDE data sets show that the performance of multi-tasking is better than that of single Hash code learning, which verifies the rationality of the idea of multi-tasking.

TABLE 1

| Method | 24 bits | 48 bits | 64 bits | 128 bits | 256 bits |
|---|---|---|---|---|---|
| DJMH-Single | 0.73 | 0.78 | 0.79 | 0.827 | 0.833 |
| DJMH-Multiple | 0.801 | 0.827 | 0.831 | 0.846 | 0.855 |

Table 2 provides a second simulation experiment result according to the method of the present disclosure, which is measured by MAP. NUS-WIDE data sets are further studied for the influence of the number of Hash codes of multiple lengths on a Hash code of any length, and it is verified that learning more Hash codes at the same time can also improve the retrieval performance of a Hash code of any length (take 24 bits as an example).

TABLE 2

| Method | 24 bits | 48 bits | 64 bits | 128 bits | 256 bits |
|---|---|---|---|---|---|
| DJMH-24, 48 | 0.755 | 0.777 | | | |
| DJMH-24, 48, 64 | 0.777 | 0.8 | 0.806 | | |
| DJMH-24, 48, 64, 128 | 0.791 | 0.816 | 0.821 | 0.834 | |
| DJMH-24, 48, 64, 128, 256 | 0.8 | 0.822 | 0.828 | 0.847 | 0.855 |

Preferably, there are five convolution layers in Step b), each of the convolution layers is connected to a pooling layer, and adopts a convolution kernel with a size of 3*3, each of the pooling layers adopts a pooling kernel with a size of 2*2, and both the convolution layer and the pooling layer apply a Relu activation function.

Preferably, the multi-branch network in Step c) is composed of N branches of a same structure, and each branch is composed of three full connect layers connected in series with one another.

Preferably, N in Step c) is a positive integer.

Preferably, M in Step f) is 5000.

Finally, it should be noted that the above descriptions are only preferred embodiments of the present disclosure and are not intended to limit the present disclosure. Although the present disclosure is described in detail with reference to the foregoing embodiments, a person skilled in the art can still make modifications to the technical solutions described in the foregoing embodiments, or make equivalent replacement of some technical features therein. Any modifications, equivalent substitutions, improvements, and the like made within the spirit and principle of the present disclosure should be included within the protection scope of the present disclosure.

What is claimed is:

1. A multi-task deep Hash learning-based retrieval method for massive logistics product images, comprising the following steps:
    a) conducting image preprocessing on an input logistics product image $x_i$, and constructing a similarity matrix s among logistics product images according to a label of the image $x_i$;

b) conducting convolution and pooling on the preprocessed logistics product image to obtain a one-dimensional feature vector $h_{img}$ of the image, and taking the one-dimensional feature vector $h_{img}$ as a low-level image feature;

c) inputting the low-level image feature $h_{img}$ to a multi-branch network to obtain a high-level image representation $B_k$ indicated by Hash codes of a plurality of lengths, wherein the multi-branch network is composed of N branches of a same structure;

d) calculating a similarity loss function $SI_{Loss}$ by formula $$SI_{Loss} = \text{Loss}(s_{ij}, b_i b_j^T) = -\frac{1}{n}\sum_{n=0}^{n=1000} s_{ij} b_i b_j^T - \log(1 + e^{b_i b_j^T}),$$

wherein $s_{ij}$ denotes similarity between an i th image and a j th image, $s_{ij} \in \{1,0\}$, the value of $s_{ij}$ being 1 indicates the i th image is similar to the j th image, the value of $s_{ij}$ being 0 indicates the i th image is not similar to the j th image, $b_i$ denotes a binary Hash code regarding data of the i th image, $b_j$ denotes a binary Hash code regarding data of the j th image, and T denotes transposition;

e) calculating a mutual information loss function $MI_{Loss}$ by formula $$MI_{Loss} = \\ \text{Loss}(B_k, W_k^T B_{k+1}) + \gamma_k \|W_k\|_1 = \sum_{k=0}^{N-1} a_k \|B_K - W_K^T B_{k+1}\|_1 + \sum_{K=0}^{N-1} \gamma_k \|W_k\|_1,$$

wherein $B_k$ denotes a Hash code output from a k th branch, $k \in \langle 0, \ldots, N-1 \rangle$, $B_{k+1}$ denotes a Hash code output from a k+1 th branch, $W_k$ denotes a mapping matrix for mapping the Hash code output from the k th branch to the Hash code output from the k+1 th branch, $\gamma_k$ denotes a regularization parameter, $\|\cdot\|_l$ denotes an L1 norm, and $a_k$ denotes an optimization parameter;

f) optimizing the similarity loss function $SI_{Loss}$ and the mutual information loss function $MI_{Loss}$ using a stochastic gradient descent algorithm, and after optimization, repeating Step a) to Step e) at least M times to obtain a trained model;

g) inputting image data in a database to the trained model in Step f) to obtain a binary Hash code representation $B_{database}$ of different lengths for each image;

h) inputting an image to be retrieved $img_{query}$ to the trained model in Step f) to obtain a binary Hash code representation $B_{query}$ of the image to be retrieved $img_{query}$;

i) calculating a Hamming distance $Dist_{Hamming}$ by formula $Dist_{Hamming} = \|B_{query} \oplus B_{database}\|$, and obtaining, based on the calculated Hamming distance $Dist_{Hamming}$, mean average precision of a query set of all images to be retrieved in a measurement manner of Average Precision; and j) performing similarity retrieval on all images to be retrieved for finding required pictures based on the obtained mean average precision.

2. The multi-task deep Hash learning-based retrieval method for massive logistics product images according to claim 1, wherein there are five convolution layers in Step b), each of the convolution layers is connected to a pooling layer, and adopts a convolution kernel with a size of 3*3, each of the pooling layers adopts a pooling kernel with a size of 2*2, and both the convolution layer and the pooling layer apply a Relu activation function.

3. The multi-task deep Hash learning-based retrieval method for massive logistics product images according to claim 1, wherein the multi-branch network in Step c) is composed of N branches of a same structure, and each branch is composed of three full connect layers connected in series with one another.

4. The multi-task deep Hash learning-based retrieval method for massive logistics product images according to claim 1, wherein N in Step c) is a positive integer.

5. The multi-task deep Hash learning-based retrieval method for massive logistics product images according to claim 1, wherein M in Step f) is 5000.

* * * * *